May 8, 1962 M. TAYLOR 3,033,045
GYROSCOPIC DEVICES
Filed April 5, 1957

INVENTOR.
MARVIN TAYLOR
BY
Raymond A. Paquin
ATTORNEY.

United States Patent Office 3,033,045
Patented May 8, 1962

3,033,045
GYROSCOPIC DEVICES
Marvin Taylor, Bethpage, N.Y., assignor to American Bosch Arma Corporation, a corporation of New York
Filed Apr. 5, 1957, Ser. No. 651,090
5 Claims. (Cl. 74—5.4)

The present invention relates to gyroscopic devices and has particular reference to tank construction for fluid suspended sensitive elements.

Fluid suspended gyroscopic devices of recent design are typified by the instrument disclosed in U.S. Patent 2,677,194 for "Gyroscopic Compass." In these devices, the weight of the gyro wheel casing and the inner gimbal ring are supported by a heavy fluid. Correcting torques can be applied to the sensitive element through torsion members connected between the casing and the inner gimbal ring and between the inner gimbal ring and the follow up gimbal, which is also the tank containing the heavy fluid, by relative displacement of the elements linked by the torsion members. The motive means driving the gyroscope wheel creates considerable heat and is a prime factor in producing convection currents in the suspending fluid. These convection currents may cause application of error producing torques to the gyro under certain conditions. In order to reduce these fluid torques on the gyro, it is desirable to have the gyro casing spherical and housed in a spherical enclosure. The floating gimbal in a two degree of freedom gyro normally disturbs this sphere-sphere relationship. This invention obviates this fault by having the gimbal recessed in a separate tank enclosure.

To this end, the present invention contemplates a tank comprised of a spherical inner chamber and an outer annular chamber for housing the gyro ball and gimbal ring respectively, the two chambers being connected only by the small holes made in the separating wall for the torsion members which are connected between the gyro casing and the gimbal ring.

For a more complete understanding of this invention, reference may be had to the accompanying diagrams, in which—

Figure 1:
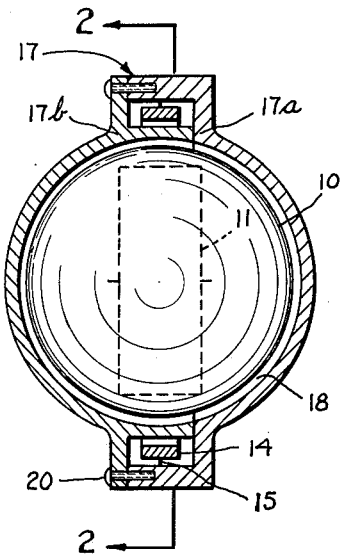
FIG. 1 is a cross sectional view of the composite tank along plane 1—1 of FIG. 2.
Figure 2:
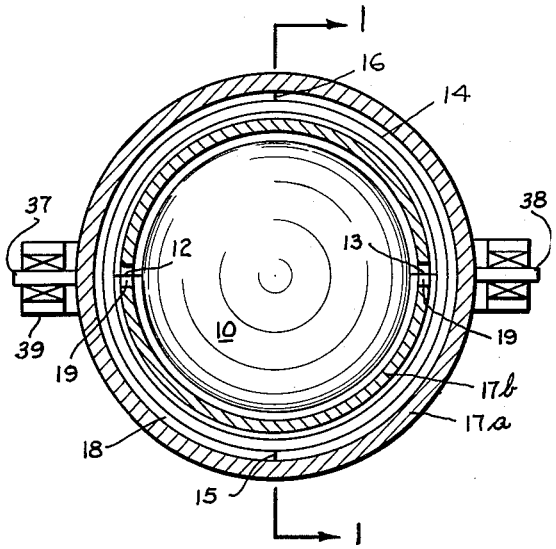
FIG. 2 is a cross sectional view of the tank along plane 2—2 of FIG. 1.

Referring now to the FIGURES 1 and 2, a spherical shell 10 houses a gyroscopic wheel 11 which is adapted to be rotated at high speed about a horizontal spin axis by electric motive means (not shown). Normally horizontally disposed torsion members 12 and 13 extend between the shell 10 and the gimbal ring 14, substantially in the plane of wheel 11 and normally vertically disposed torsion members 15 and 16 perpendicular to torsion members 12, 13 extend between the gimbal ring 14 and the tank 17. Torsion members 12, 13, 15 and 16 are generally thin wires by means of which the correcting torques can be applied to the gyro 11 by relative displacement of the tank, gimbal ring and sphere in the manner fully described in U.S. Patent 2,677,194 for "Gyroscopic Compass." Also, as described in that patent the sphere 10 and gimbal ring 14 are suspended in neutral flotation in a fluid 18 since the torsion members 12, 13, 15 and 16 are incapable of supporting the weight of the gimbal ring 14, the ball 10 and gyro 11.

It has been found that convection currents in this supporting fluid 18, produced in part by the temperature rise created within sphere 10 by the motive means for gyro wheel 11, will cause disturbing torques which affect the gyro accuracy. In order to minimize the error producing effects of these torques the convection current paths must be symmetrical about the ball 10 as will occur when a spherical ball is centered within a spherical tank. In prior instruments, the inner gimbal ring 14 has always disturbed this sphere-sphere relationship. One method of providing the spherical relationship is described in U.S. patent application S.N. 479,144, filed December 31, 1954, where the inner gimbal ring is located within a channel having tapered sides encircling the gyro ball. The present invention seeks to improve the continuity of the adjacent spherical surface by enclosing the ball 10 in an inner spherical tank portion and enclosing the gimbal ring 14 in an outer substantially separate tank portion or recess.

Figure 3:
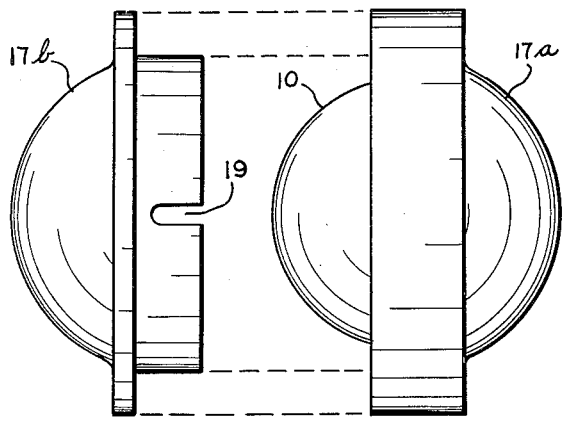
FIG. 3 is an outline drawing of the two unassembled halves of the tank.

Accordingly, the tank 17 is constructed in two sections, 17a and 17b (FIG. 3) which, when joined together, as by connection 20, provide an inner spherical chamber in which the ball 10 is located and an outer annular chamber for receiving the gimbal ring 14. The sphericity of the inner chamber is broken only by slots 19 (FIG. 3), which are provided in section 17b, to permit the connection of the torsion members 12 and 13 to gimbal ring 14, in the outer chamber and the spherical ball 10 in the inner chamber. The assembly of the instrument preferably constitutes initial sub-assembly of the sphere 10, gimbal ring 14 and the torsion members 12, 13, 15 and 16 in the section 17a, and the completion of the tank 17 by attaching section 17b to section 17a. The interior of the tank 17 is then filled with the heavy fluid 18 through an opening (not shown) in tank 17.

It will be seen, therefore, that the ball 10 is housed in a truly spherical enclosure (except for slots 19) so that any convection currents in the fluid 18 which might apply unsymmetrical torques to the ball 10 are held to a minimum and, therefore, the error producing torques applied to the gyro are small. The convection currents in the inner spherical chamber do not affect the gimbal ring 14 in the outer chamber because of the intervening tank wall. Also, the only internal heat source is located in the inner spherical chamber and since the intervening tank wall distributes the heat from this source, convection currents in the annular tank are almost non-existent.

The tank 17 may be supported by shafts 37, 38 in the inner gimbal ring 39 of a gyro compass gimbal structure, for example, of the type disclosed in the aforementioned U.S. Patent 2,677,194. The pickoff devices, follow-up mechanisms and electrical circuitry (not shown here) are effective in restraining the magnitude of the displacement between the gimbal ring 14 and tank 17 to a small value so that there will be no physical contact between the gimbal ring 14 and tank 17 within the annular chamber, or between the torsion members 12 and 13 and tank 17 at the slots 19.

Although the physical embodiment herein described is directly applied to a gyroscopic compass, the invention is not to be limited thereby since the two chambered tank can also be used to advantage in any type of directional gyroscope including stable verticals, for example.

I claim:

1. In a device of the character described, a substantially spherical shell, a gyroscope wheel in said shell, a gimbal ring, means connecting said shell and gimbal ring, to allow relative rotation therebetween, a tank including an inner spherical chamber and an outer chamber surrounding said inner spherical chamber and separated therefrom, said shell being located in said spherical chamber and said gimbal ring being located in said outer chamber.

2. In a device of the character described, a substantially spherical shell, a gyroscope wheel in said shell, a gimbal ring, means connecting said shell and gimbal ring, to allow relative rotation therebetween, a tank including an inner spherical chamber and an outer chamber surrounding said inner spherical chamber and separated therefrom, said shell being located in said spherical chamber and said gimbal ring being located in said outer chamber, and means connecting said gimbal ring and said tank.

3. In a device of the character described, a substantially spherical shell, a gyroscope wheel in said shell, a gimbal ring, first torsion members between said shell and said gimbal ring, a tank including an inner spherical chamber and an outer annular chamber surrounding said inner spherical chamber and separated therefrom by a wall, said shell being located in said spherical chamber, said gimbal ring being located in said annular chamber, and openings in said wall for said torsion members.

4. In a device of the character described, a substantially spherical shell, a gyroscope wheel in said shell, a gimbal ring, first torsion members between said shell and said gimbal ring, a tank including an inner spherical chamber and an outer annular chamber surrounding said inner spherical chamber and separated therefrom by a wall, said shell being located in said spherical chamber, said gimbal ring being located in said annular chamber, openings in said wall for said torsion members, and second torsion members between said gimbal ring and said tank.

5. In a device of the character described, a substantially spherical shell, a gyroscope wheel in said shell, a gimbal ring, first torsion members between said shell and said gimbal ring, a tank including an inner spherical chamber and an outer annular chamber surrounding said inner spherical chamber and separated therefrom by a wall, said shell being located in said spherical chamber, said gimbal ring being located in said annular chamber, openings in said wall for said torsion members, and a suspension fluid filling said tank.

No references cited.